United States Patent [19]

Bayerlein et al.

[11] Patent Number: 4,753,659
[45] Date of Patent: Jun. 28, 1988

[54] DERIVATIVES OF CASSIA TORA POLYSACCARIDES AND THEIR USE

[75] Inventors: Friedrich Bayerlein, Krailling; Nikolaos Keramaris, Eichenau; Manfred Kuhn; Ulrich Beck, both of Munich; Nikolaus Kottmair, Gauting, all of Fed. Rep. of Germany; Michel Maton, Gaucresson, France

[73] Assignee: Diamalt Aktiengesellschaft, Fed. Rep. of Germany

[21] Appl. No.: 894,750

[22] Filed: Aug. 11, 1986

Related U.S. Application Data

[63] Continuation of Ser. No. 687,059, Dec. 28, 1984, abandoned.

[30] Foreign Application Priority Data

Dec. 29, 1983 [DE] Fed. Rep. of Germany ....... 3347469
Aug. 28, 1984 [DE] Fed. Rep. of Germany ....... 3431589

[51] Int. Cl.$^4$ ...................... C09B 67/00; C07H 15/04
[52] U.S. Cl. ......................................... 8/561; 514/23; 514/54; 536/114; 252/8.6

[58] Field of Search ................... 514/23, 54; 536/114; 8/561

[56] References Cited

U.S. PATENT DOCUMENTS

| | | | |
|---|---|---|---|
| 2,496,670 | 2/1950 | Moe | 536/114 |
| 3,326,890 | 6/1967 | Engelskirchen et al. | 536/114 |
| 3,723,408 | 3/1973 | Nordgren et al. | 536/114 |
| 3,748,201 | 7/1973 | Jordan | 536/114 |
| 4,031,307 | 6/1977 | Demartino et al. | 536/114 |
| 4,094,795 | 6/1978 | DeMartino et al. | 536/114 |
| 4,162,925 | 7/1979 | Tiefenthaler et al. | 536/114 |

OTHER PUBLICATIONS

Varshney et al., *J. Arg. Food Chem.*, 21, 222, (1973).

*Primary Examiner*—J. R. Brown
*Assistant Examiner*—Elli Peselev
*Attorney, Agent, or Firm*—Robbins & Laramie

[57] ABSTRACT

The invention relates to new alkyl ethers and phosphoric acid esters of Cassia tora polygalactomannans and their use, alone or in combination with other thickening agents, as thickening agents.

12 Claims, No Drawings

DERIVATIVES OF CASSIA TORA POLYSACCARIDES AND THEIR USE

This application is a continuation of application Ser. No. 687,059, filed Dec. 28, 1984, now abandoned.

The term "polygalactomannans" (or "galactomannans") is understood to mean all polysaccharides which contain mannose and galactose units and in addition can also contain minor amounts of other sugar residues.

Polygalactomannans are mainly found in the endosperm portions of seeds of various Leguminosae such as guar, locust bean, *Cassia occidentalis*, tara, flame tree and the like. Both the pure polygalactomannans mentioned above, and also many of their derivatives, are known. Carboxyalkyl ethers and polyhydroxyalkyl ethers of such polygalactomannans, derived from guar gum, locust bean gum, honey locust, flame tree and the like, are described in U.S. Pat. Nos. 2,477,544 and 2,496,670.

U.S. Pat. No. 3,467,647 describes polysaccharides which contain both cationic and anionic substituents. Starches, locust bean gum and guar are mentioned as polysaccharides, and phosphate esters, among others, are mentioned as anionic substituents.

U.S. Pat. No. 4,031,306 describes the production of polygalactomannan alkyl ethers. In U.S. Pat. No. 4,169,945 there is described a process for the production of polygalactomannan alkyl ethers, were the polygalactomannan can be guar or locust bean gum.

U.S. Pat. No. 4,162,925 describes phosphate esters of locust bean gum with a degree of substitution of 0.03-0.5. European Pat. No. 0,030,443 describes the phosphating of guar with a degree of substitution of 0.1-0.5 and a viscosity of 50-4,000 milli-Pascal-seconds for a 2% aqueous solution, and also the use of the guar phosphate ester in the paper industry.

It has now been found that the substituted and unsubstituted alkyl ethers and the phosphate esters of polysaccharides which are present in the endosperm portions of *Cassia tora* are, surprisingly, distinguished by properties deviating from those of the corresponding derivatives of polysaccharides from other sources. They can, for example, advantageously be used as thickening agents having improved stability to heat, acid, and shear. Such thickening agents are used, e.g., in the paper industry as bulk additives, in well drilling fluids as viscosity-increasing additives, and also in printing pastes for textile printing.

*Cassia tora* (L. Baker), also termed *Cassia obtusifolia* (Linn), represents a kind of cassia which thrives preferably in a tropical climate. The polysaccharides wich are present in the endosperm portions of *Cassia tora* are built up chiefly of galactose and mannose units, and only a minor amount of other sugar residues. In particular, they are polygalactomannans.

The pure galactomannans of various botanical origins show slight differences, as regards their chemical structure and composition, which exert an influence on cold water solubility, thickening properties, and interactions with other polysaccharides (carrageenan, xanthan). The best known polygalactomannans are those from *Cyamopsis tetragonoloba* L. (guar), *Cesalpinia spinosa* L. (tara), and *Ceratonia siliqua* L. (locust bean). Their molecular weights are about 200,000-300,000. The main chain is composed of mannose molecules joined by beta-1,4-glucosidic bonds. Unsubstituted polymannans are completely insoluble in water. The attachment of galactose units to the primary hydroxyl groups of the mannose units (C-6 atom of the mannose molecule) by alpha-1,6-glucosidic bonds increases water solubility, particularly cold water solubility.

The greater the substitution of the mannose main chain with galactose molecules, the greater is also the cold water solubility of the polygalactomannan.

Locust bean gum (abbreviated as LBG), which has hitherto been preferably used as the raw material for the products for textile finishing, is obtained from the locust bean trees. Locust bean trees principally flourish in the Mediterranean, California, and Australia, and give a full harvest only after 10-15 years of growth. Hence, LBG is only available to the user to a limited degree. This has resulted in a search for an alternative.

The alkyl ethers according to the invention are in general those having 1-4 carbon atoms in the alkyl group, and especially methyl ethers, ethyl ethers, n-propyl ethers, isopropyl ethers as well as butyl ethers and the structural isomers of the butyl ethers of the polysaccharides present in the endosperm of *Cassia tora*. They can be produced by reacting *Cassia tora* galactomannan with an alkyl halide or diazomethane in a known manner.

Thus, the reaction of the polygalactomannans derived from the endosperm portions of *Cassia tora* with methyl halides gives methyl ethers, and with ethyl halide gives ethyl ethers. Preferred methyl and ethyl halides are methyl and ethyl chlorides.

It is preferred that the substituted alkyl ethers according to the invention possess 1-4 carbon atoms in the alkyl group and bear as substituents hydroxyl, carboxyl, and trialkylammonium groups. Examples of the compounds according to the invention are hydroxypropyl cassia galactomannan, hydroxyethyl cassia galactomannan, and carboxymethyl cassia galactomannan. A particularly preferred ether is the hydroxypropyl ether.

These compounds according to the invention can be produced by reacting *Cassia tora* galactomannans in a known manner with alkylene oxides, acrylonitrile, halogen fatty acid derivatives, or quaternary ammonium compounds containing an epoxyalkyl or halohydrin group.

Thus the reaction of the polygalactomannans derived from the endosperm portions of *Cassia tora* with alkylene oxides gives hydroxyalkyl ethers. Preferred alkylene oxides are ethylene oxide and propylene oxide. Nonionic compounds are produced in these reactions.

The reaction of *Cassia tora* galactomannans with quaternary ammonium compounds which contain an epoxyalkyl or halohydrin group gives cationic derivatives. Preferred quaternary compounds are glycidyl-trialkylammonium halides or 3-halogen-2-hydroxypropyl-trialkylammonium halides. The particularly preferred hydroxyalkyl ethers substituted with di- or tri-alkylammonium are the di- and tri-methylammonium-hydroxyalkyl ethers. The reaction of *Cassia tora* galactomannans with halogen fatty acids or their salts and with acrylic acid derivatives leads to anionically substituted alkyl galactomannans. The preferred anionic derivative is carboxymethyl galactomannan, which can be produced by reacting *Cassia tora* galactomannan with the sodium salt of monochloroacetic acid.

The phosphated *Cassia tora* galactomannan according to the invention is the ester of phosphoric acid and the polygalactomannans derived from the endosperm portions of *Cassia tora*. Phosphoric acid, and/or its alkali or ammonium salt, is used for the esterification of the polygalactomannan. By all indications, the resulting ester is the monoester of phosphoric acid.

The phosphating reaction can be carried out in many ways. The *Cassia tora* polygalactomannan can be first mixed with an aqueous solution of the alkali hydroxide and then with the phosphoric acid. The *Cassia tora* polygalactomannan can also be first mixed with the phosphoric acid and then with an aqueous solution of the alkali hydroxide. The alkali salt of phosphoric acid can also be first produced from the phosphoric acid and the alkali hydroxide, and then mixed with *Cassia tora* polygalactomannan. A mixture can first be produced from monodosium phosphate and disoium phosphate in a 1:1 molar ratio and then the aqueous solution of it, with a pH of about 6, can be mixed with *Cassia tora* polygalactomannan. *Cassia tora* polygalactomannan can be used in the form of powder or chips. The phosphating reaction is carried out at 115°–175° C., preferably at about 150° C., for 30 minutes to 5 hours.

When sodium hydroxide and phosphoric acid are mixed in succession with the *Cassia tora* polygalactomannan, 10–65 parts by weight of sodium hydroxide, 15–100 parts by weight of phosphoric acid and 50–300 parts by weight of water are mixed for the reaction of 162 parts by weight of polygalactomannan, in a proper portion such that the pH value lies between 6 and 7. The reagents are preferably used in a proportion of 27.5 parts by weight of sodium hydroxide to 45.5 parts by weight of phosphoric acid as well as 200 parts by weight of water for the reaction of 162 parts by weight of *Cassia tora* polygalactomannan.

The degree of substitution of the ethers and esters, especially the alkyl ethers, according to the invention is between 0.03 and about 3.0, preferably between 0.1 and 0.5; the viscosity (3 weight percent in water) is about 100–40,000 mPas (Brookfield RVT, at 20 rpm and 20° C.). For the phosphoric acid esters according to the invention, a degree of substitution of 0.03–1.5, in particular of 0.1–0.5, and a viscosity of 100–10,000 mPas are preferred.

The galactomannan derivatives according to the invention can also be used in a depolymerized form as thickening agents. The molecular weights and viscosities can be reduced by hydrolytic or oxidative depolymerization.

It is known to thicken dyestuff solutions or dispersions for the printing and dyeing of textile substrates by means of natural polysaccharides or their derivatives. Such natural polysaccharides, or derivatives thereof, used in textile finishing are obtained from, e.g., starches, alginates, transparent gums or plant gums and galactomannans. Unmodified galactomannans are both cold water soluble—e.g., the guar gums—and also insoluble, or only partially soluble, in cold water—e.g., locust bean gum. Cold water solubility, or improved cold water solubility, can be achieved by chemical derivatization or, in some cases, by mechanical or thermal decomposition.

According to U.S. Pat. No. 2,477,544, locust bean gum and locust bean gum ethers, abbreviated below as LBG and LBG ethers, are especially recommended from the series of galactomannans for the thickening of aqueous dyeing systems.

The advantage of LBG and LBG ethers is an excellent penetration of the printing pastes, a very good leveling ability, brilliant dye appearance, very good film formation, and good rinsability from the textile substrate. Apart from this, the processability of the printing pastes on the machine is positively influenced by the use of LBG or LBG ethers. This is especially clearly evidenced in easier transferability of the printing pastes from the depressions of the gravure roller onto the substrate and a low sensitivity to squeezing. These good properties are not achieved, or only partially achieved, by the other galactomannans or their derivatives as hitherto used in textile finishing.

It has now surprisingly been found that the present invention's alkyl ethers and phosphate esters of the polygalactomannans present in the endosperm portions of *Cassia tora* have, and even surpass, the described advantages of LBG or LBG ethers, but do not possess their disadvantages.

They are outstandingly suitable as thickening agents in general, and in particular as printing thickening agents for textile and paper printing.

Unmodified galactomannans are both cold water soluble—e.g., guar gum—and also insoluble, or only partially soluble, in cold water—e.g., locust bean gum. Cold water solubility, or improved cold water solubility, can be achieved by chemical derivatization or, in some cases, by mechanical or thermal decomposition. While *Cassia tora* polygalactomannan is only slightly soluble in cold and hot water, the alkyl ethers and the phosphate esters have good solubility in cold and hot water.

Apart from this, they can be utilized as well drilling fluid auxiliaries, in mining, and also in the explosives industry.

Since the Cassia alkyl ethers according to the invention are thermally stable, they can be utilized, in particular, in petroleum recovery and well drilling. The viscosity of the Cassia derivatives according to the invention remains stable for several hours on keeping in closed autoclaves, both in the neutral and in the strongly alkaline region, and at a temperature above 120° C.

The derivatives according to the invention of the galactomannans derived from the endosperm of *Cassia tora* can be used alone, partially in combination with each other, or together with other polysaccharide derivatives. Such other polysaccharide derivatives are, e.g., guar gum, depolymerized guar gum, carboxymethyl starch, British gum, sodium alginate, xanthan gum, and carboxymethyl guar.

Examples of suitable combinations are:

(1) 1–100 parts by weight methyl cassia or hydroxymethyl cassia
    99–0 parts by weight guar gum
(2) 1–100 parts by weight methyl cassia
    99–0 parts by weight carboxymethyl starch
(3) 20–60 parts by weight methyl cassia
    10–30 parts by weight sodium alginate
    70–10 parts by weight carboxymethyl starch
(4) 10–60 parts by weight methyl cassia
    10–30 parts by weight hydroxypropyl cassia
    80–20 parts by weight carboxymethyl guar
(5) 20–60 parts by weight ethyl cassia
    10–30 parts by weight methyl cassia
    70–10 parts by weight carboxymethyl starch
(6) 20–60 parts by weight allyl cassia
    10–30 parts by weight hydroxypropyl cassia
    70–10 parts by weight carboxymethyl starch
(7) 5–100 parts by weight hydroxyethyl cassia
    95–0 parts by weight depolymerized guar gum
(8) 20–80 parts by weight hydroxypropyl cassia
    80–20 parts by weight carboxymethyl starch
(9) 20–60 parts by weight hydroxyethyl cassia
    10–30 parts by weight sodium alginate
    70–10 parts by weight carboxymethyl starch
(10) 30–100 parts by weight hydroxypropyl cassia -continued 70–0 parts by weight of xanthan gum
(11) 10–60 parts by weight trimethylammonium-hydroxypropyl cassia chloride
90–40 parts by weight British gum
(12) 10–60 parts by weight carboxymethyl cassia
10–30 parts by weight carboxymethyl guar
80–20 parts by weight carboxymethyl starch Examples of suitable thermally stable combinations are:

(1) 5–100 parts by weight methyl cassia
95–0 parts by weight methyl guar
(2) 20–60 parts by weight methyl cassia
10–30 parts by weight methyl guar
70–10 parts by weight allyl cassia
(3) 20–60 parts by weight methyl cassia
10–30 parts by weight ethyl cassia
70–10 parts by weight methyl guar Cotton, rayon, wool, silk, acetate, triacetate, polyester, polyamide and polyacrylonitrile can preferably be processed in the utilization of the described *Cassia tora* derivatives in aqueous textile printing and for the continuous dyeing of planar textile structures of cellulosic, animal, and synthetic materials or their mixtures.

In a further aspect of the present invention, it was found that the alkyl ethers and phosphate esters of *Cassia tora* described above, and also other derivatives of *Cassia tora*, exhibit a synergistic effect with other materials which are suitable as thickening agents, such as carrageenan, agar, xanthan, polyacrylates and polymethacrylates, and in particular with xanthan.

Not all *Cassia tora* derivatives exhibit this synergistic effect: for example, cationic derivatives are not suitable.

It was found that with increasing degree of substitution of the *Cassia tora* ethers and esters, the water solubility of these derivatives admittedly increases, but the synergism decreases. Synergism is no longer present with total substitution.

Suitable *Cassia tora* derivatives which show this synergism are alkyl ethers, carboxyalkyl ethers, hydroxyalkyl ethers, especially those in which the alkyl group has 1–4 carbon atoms, and also the said phosphate esters.

By "xanthan" is understood a high-molecular polysaccharide, obtained in a fermentation process with the microorganisms *Xanthomonas mulracean, Xanthomonas campestris, Xanthomonas phaseoli, Xanthomonas carotae,* and the like (see U.S. Pat. Nos. 3,557,016 and 4,038,206).

Carrageenan is a galactan extracted from red algae (Rhodophyceae), and partially contains anhydrogalactose and is partially esterified with sulfuric acid.

U.S. Pat. No. 4,246,037 describes the synergistic viscosity increase of mixtures of xanthan gum and tamarind meal (meal from *Tamarindus indica*).

U.S. Pat. No. 3,557,016 discloses that an increase of viscosity takes place when a mixture of locust bean gum (90–50%) and xanthan (10–50%) is added to hot water (66°–82° C.) and is allowed to stand at this temperature for more than 15 minutes. In the U.S. Food Chemical Codex, II, p. 856, it is disclosed that this cross-linkage (synergism) is used as evidence of locust bean gum.

U.S. Pat. No. 4,162,925 describes the synergistic viscosity increase of mixtures of xanthan gum and phosphate esters of locust bean gum with a degree of substitution of 0.03–0.5.

It has now been found that both the cold water soluble *Cassia tora* galactomannan ethers and the cold water soluble *Cassia tora* galactomannan esters show synergistic behavior with xanthan gum, carageenan, and other substances. When carrageenan is used as a constituent, the viscosity increase due to synergism first takes place after the mixture has been heated in water for at least 15 minutes.

When xanthan gum is used as the constituent, heating or boiling of the aqueous mixture is no longer necessary.

The mixing ratio of *Cassia tora* galactomannan ether or ester to the synergistic component such as, e.g., xanthan gum, can be varied greatly. The synergistic mixtures according to the invention consist of 10–90 weight percent *Cassia tora* galactomannan ether or ester and correspondingly 90–10 supplementary parts of xanthan gum, making up 100 percent. The maximum viscosity increase is achieved, however, with mixtures of 75–50 parts by weight of *Cassia tora* galactomannan ether or ester and correspondingly 25–50 parts by weight of xanthan gum, making up 100 percent.

By simple brief stirring of the mixture into cold water (without heating or strong shear forces), hydration takes place within 5 minutes. Complete hydration is reached after about 15 minutes.

The gels according to the invention are produced by briefly stirring 0.3–2 weight percent of the mixture of *Cassia tora* galactomannan ether or ester and xanthan with cold water. The viscosity or the strength of the gel increases with increasing concentration. Flowable gels are produced at a concentration of 0.3–0.7 percent (in water, based on dry material). At a concentration above 1 percent, the gels are no longer flowable, but are more or less solid. The mixtures of cassia galactomannan ether or ester and xanthan can also contain other cold water soluble thickening agents (such as guar and guar derivatives, LBG derivatives, tara and tara derivatives, cellulose and starch derivatives, and tamarind derivatives).

The gels according to the invention can be used in well drilling and petroleum recovery. The viscosity of the gels according to the invention remains stable on keeping for several days in closed autoclaves both in the neutral and in the strongly alkaline region and at a temperature above 120° C. Apart from this, they can be used in the textile, paper, and explosives industries. Quite generally, these gels can also be utilized, due to their particular suspending ability, wherever it is necessary to hold solid particles in suspension in aqueous liquids and prevent them from settling out.

The invention is illustrated in detail in the following examples. The "parts" stated in the examples are parts by weight. The viscosity, unless otherwise stated, was measured on a Brookfield rotary viscometer RVT at 20° C. and 20 rpm, with the suitable spindle.

EXAMPLE 1

Hydroxypropyl cassia galactomannan 162 parts of polygalactomannan from *Cassia tora* were reacted with 58 parts of propylene oxide in an alkaline aqueous medium at a temperature of 60° C. A light brown solid, soluble in cold water, was obtained.

The viscosity (3% in water, measured on the Brookfield rotary viscometer RVT, spindle 6, 20° C. and 20 rpm) was about 20,000 mPas. The average molecular weight was about 200,000 and the degree of substitution was 0.65.

EXAMPLE 2

Hydroxyethyl cassia galactomannan 162 parts of polygalactomannan from *Cassia tora* were reacted with 22 parts of ethylene oxide in an alkaline aqueous medium at a temperature of 42° C. A light brown solid, soluble in cold water, was obtained.

The viscosity (3% in water, measured on a Brookfield rotary viscometer RVT, spindle 6, 20° C. and 20 rpm) was about 40,000 mPas. The average molecular weight was about 250,000, and the degree of substitution was 0.31.

EXAMPLE 3

Carboxymethyl cassia galactomannan 162 parts of polygalactomannan from *Cassia tora* were reacted with 35 parts of the sodium salt of monochloroacetic acid and 15 parts of sodium hydroxide in aqueous medium at a temperature of 68° C. A light brown solid, soluble in cold water, was obtained.

The viscosity (3% in water, measured on a Brookfield rotary viscometer RVT, spindle 6, 20° C. and 20 rpm) was about 15,000 mPas. The average molecular weight was about 180,000, and the degree of substitution was 0.23.

EXAMPLE 4

2-hydroxy-3-(trimethylammonium)propyl *Cassia tora* galactomannan chloride 200 parts of polygalactomannan from *Cassia tora* were reacted with 68 parts of glycidyl-trimethylammonium chloride (75% aqueous solution) in an alakline aqueous medium at a temperature of 52° C. A light brown solid, soluble in cold water, was obtained.

The viscosity (3% in water, measured on a Brookfield rotary viscometer RVT, spindle 6, 20° C. and 20 rpm) was 18,000 mPas. The average molecular weight was about 190,000, and the degree of substitution was 0.18.

EXAMPLE 5

Hydroxypropyl cassia galactomannan, depolymerized 162 parts of polygalactomannan from *Cassia tora* were reacted with 25 parts of propylene oxide in an alkaline aqueous medium at a temperature of 60° C. After depolymerization with 20 parts ofhydrogen peroxide, a light brown solid, soluble in cold water, was obtained.

The viscosity (10% in water, measured on a Brookfield rotary viscometer RVT, spindle 6, 20° C. and 20 rpm) was about 10,000 mPas. The average molecular weight wasabout 18,000, and the degree of substitution was 0.27.

EXAMPLE 6

200 parts of endosperms from *Cassia tora* were placed in a kneading mixer and, with the mixer running, were treated with a solution of 34.07 parts of sodium hydroxide and 65.47 parts of phosphoric acid (85%) in 240 parts of water. After kneading for 45 minutes at room temperature, the reaction material was kneaded for 3½ hours at 158°–160° C. After cooling and milling, a cold water soluble product, which was strongly anionic, was obtained. Precipitation took place with polyvalent cations (or cation-active galactomannans). The degree of substitution DS($PO_4^{3-}$) was 0.25.

| Reaction time at 158°–160° C. | Viscosity - mPas (3%) |
|---|---|
| 1 hour | 600 |
| 1½ hours | 5,350 |
| 2 hours | 3,900 |
| 2½ hours | 1,950 |
| 3 hours | 380 |

For comparison, the following control experiment was performed: 200 parts of polysaccharide from endosperms of *Cassia tora* were placed in a kneading mixer and, with the mixer running, treated with 250 parts of water. After kneading for 45 minutes at room temperature, the strongly swollen chips were heated for 90 minutes at 158°–160° C. After milling, the brownish powder thus prepared showed hardly any viscosity. Also, only slight hydration took place after boiling. A 3% mixture showed no viscosity in the cold, and a viscosity of 370 mPas after boiling.

EXAMPLE 7

400 parts of polysaccharide from endosperms of *Cassia tora* were placed in a kneading mixer and, with the mixer running, were treated with a solution of 68 parts of sodium hydroxide and 132 parts of phosphoric acid (85%) in 480 parts of water. The reaction material was mixed for 2 hours at room temperature and a further 2 hours at 60° C. It was then heated to 158°–160° C. and kneaded at this temperature for 3 hours. After milling, a brownish, cold water soluble product was obtained with a degree of substitution of 0.2.

| Reaction time at 158°–160° C. | Viscosity - mPas (3%) |
|---|---|
| After 90 minutes | 440 |
| 120 minutes | 3,450 |
| 150 minutes | 3,750 |
| 180 minutes | 1,300 |

EXAMPLE 8

200 parts of polysaccharide from endosperms of *Cassia tora* were placed in a kneading mixer and, with the mixer running, treated with a solution of 33 parts of phosphoric acid (85%) in 100 parts of water and mixed for 30 minutes at room temperature. A solution of 17 parts of sodium hydroxide in 80 parts of water was then added and mixed for a further 15 minutes.

The reaction material was kneaded for 3.5 hours at 158°–160° C. After milling, a cold water soluble product was obtained.

| Reaction time at 158°–160° C. | Viscosity - mPas (3%) |
|---|---|
| After 30 minutes | 210 |
| 60 minutes | 570 |
| 90 minutes | 2,000 |
| 120 minutes | 2,750 |
| 150 minutes | 3,400 |
| 180 minutes | 1,850 |
| 210 minutes | 830 |

EXAMPLE 9

200 parts of polysaccharide from endosperms of *Cassia tora* were placed in a kneading mixer and, with the mixer running, treated with a solution of 66 parts of phosphoric acid (85%) in 120 parts of water and mixed for 30 minutes at room temperature. A solution of 34 parts of sodium hydroxide in 120 parts of water was then added and mixed for a further 30 minutes. The reaction material was kneaded for 3½ hours at 158°–160° C. After milling, a cold water soluble product was obtained.

| Reaction time at 158°–160° C. | Viscosity - mPas (3%) |
|---|---|
| After 60 minutes | 1,425 |
| 90 minutes | 4,000 |
| 120 minutes | 4,700 |
| 150 minutes | 5,500 |
| 180 minutes | 3,500 |
| 210 minutes | 1,500 |

EXAMPLE 10

200 parts of polysaccharide from endosperms of *Cassia tora* were placed in a kneading mixer and, with the mixer running, were treated with a solution of 34 parts of sodium hydroxide in 120 parts of water and mixed for 60 minutes. A solution of 66 parts of phosphoric acid (85%) in 120 parts of water was then added and mixed for a further 60 minutes at room temperature. The reaction material was kneaded for 3½ hours at 158°–160° C. After milling, a cold water soluble product was obtained.

| Reaction time at 158°–160° C. | Viscosity - mPas (3%) |
|---|---|
| After 60 minutes | 1,000 |
| 90 minutes | 2,350 |
| 120 minutes | 2,800 |
| 150 minutes | 3,000 |
| 180 minutes | 2,000 |
| 210 minutes | 850 |

EXAMPLE 11

200 parts of polysaccharides from endosperms of *Cassia tora* were placed in a kneading mixer and, with the mixer running, treated with a solution of 25.2 parts of monosodium phosphate and 29.8 parts of disodium phosphate in 260 parts of water and mixed for 30 minutes at room temperature. The reaction material was kneaded for 3 hours at 158°–160° C. After milling, a cold water soluble product was obtained.

| Reaction time at 158°–160° C. | Viscosity - mPas (3%) |
|---|---|
| After 60 minutes | 1,400 |
| 90 minutes | 3,150 |
| 120 minutes | 3,700 |
| 150 minutes | 3,200 |
| 180 minutes | 2,300 |

EXAMPLE 12

200 parts of polysaccharides from endosperms of *Cassia tora* were placed in a kneading mixer, and, with the mixer running, treated with a solution of 66 parts of phosphoric acid (85%) in 120 parts of water and mixed for 30 minutes at room temperature. A solution of 34 parts of sodium hydroxide in 120 parts of water was then added and mixed for a further 30 minutes. The reaction material was kneaded for 120 minutes at 158°–160° C. After milling, a cold water soluble product was obtained with a viscosity of 4,500 mPas (3%).

The brownish product was placed in an efficient mixer, treated with a solution of 5 parts of sodium hydroxide and 15 parts of hydrogen peroxide (32%) in 20 parts of water, and mixed for 15 minutes at room temperature. After a depolymerization time of 120 minutes at 80° C., neutralization with citric acid and drying in vacuum were performed. The viscosity was now 180 mPas (3%).

EXAMPLE 13

162 parts of polysaccharide from endosperms of *Cassia tora* were placed in a kneading mixer and, with the mixer running, treated with a solution of 16.8 parts of sodium hydroxide in 162 parts of water. After mixing for 60 minutes at room temperature, 20.2 parts of methyl chloride were added, and the kneader was closed. The reaction material was mixed for a further 4 hours at a reaction temperature of 70°–75° C. The excess methyl chloride was removed under vacuum and the product was dried and milled. The product was cold and hot water soluble and the viscosity was 18,500 mPas, 3% (measured with Brookfield, Model RVT at 20 rpm and 20° C.).

EXAMPLE 14

600 parts of 65% isopropanol were placed in a suitable stirrer vessel with thermometer and reflux cooler and, with the mixer running, 100 parts of meal from endosperms of *Cassia tora* and 20 parts of sodium hydroxide in 20 parts of water were added. After mixing for 45 minutes at about 25° C., 33 parts of methyl iodide were added and the mixture was heated to 72° C. The reaction material was mixed for a further 5 hours at a temperature of 73°–75° C. The product was then filtered off and the filter cake was dried in a drying chamber. The powdery product was cold and hot water soluble. The viscosity was:

(a) 6,500 mPas, 3% in conductivity water
(b) 3,800 mPas, 3% in 30% methanol
(measured in Brookfield, Model RVT at 20 rpm and 20° C.)

EXAMPLE 15

Mixtures of *Cassia tora* galactomannan phosphate ester (=PhCaGa) and xanthan gum The percent viscosity increase brought about by synergism between PhCaGa and xanthan is demonstrated in this example. Mixtures were prepared of 10–90 weight percent of PhCaGa and, correspondingly, 90–10 parts (adding to 100 percent) of xanthan (Rhodigel 23). Respectively, 3 parts of these mixtures were stirred into 297 parts of water (cold, about 20° C.) with a stirrer for about 5 minutes, and after 20 minutes the viscosity was measured on a Brookfield rotary viscometer RVT at 20° C. and 20 rpm with the suitable spindle. Table I shows the proportions in which the two components were mixed, the theoretically calculated (expected) viscositiy, the actual (found) viscosity, and the percentage increase in viscosity.

TABLE I

Synergism of *Cassia Tora* galactomannan phosphate ester (PhCaGa)/xanthan gum mixtures

| Mixture | | Theor. Visc. | Actual Visc. | % |
|---|---|---|---|---|
| Xanthan | PhCaGa | (mPas) 1% | (mPas) 1% | Increase |
| 100 | 0 | — | 3,060 | — |
| 90 | 10 | 2,763 | 4,170 | 51% |
| 70 | 30 | 2,169 | 7,000 | 222% |
| 60 | 40 | 1,872 | 9,200 | 391% |
| 50 | 50 | 1,575 | 10,000 | 535% |
| 40 | 60 | 1,278 | 11,600 | 807% |

TABLE I-continued

Synergism of *Cassia Tora* galactomannan phosphate ester (PhCaGa)/xanthan gum mixtures

| Mixture | | Theor. Visc. | Actual Visc. | % |
|---|---|---|---|---|
| Xanthan | PhCaGa | (mPas) 1% | (mPas) 1% | Increase |
| 30 | 70 | 981 | 10,250 | 945% |
| 10 | 90 | 387 | 2,575 | 565% |
| 0 | 100 | — | 90 | — |

A mixture of 60 parts of *Cassia tora* galactomannan phosphate ester and 40 parts of xanthan was prepared. A 0.5% solution of this mixture in water at room temperature formed a gel, which had a gel structure such that it prevented locust bean kernels from settling out for more than 24 hours.

EXAMPLE 16

Mixtures of hydroxypropyl cassia galactomannan (=HPCaGa) and xanthan

The percentage viscosity increase effected by synergism between hydroxypropyl cassia galactomannan and xanthan (Rhodigel 23) is demonstrated in this example. Mixtures of 75 or 50 weight percent of hydroxypropyl cassia galactomannan and, correspondingly, 25 or 50 percent complementary proportions of xanthan were prepared. Respectively 3 parts of these mixtures were stirred in 297 parts of water (cold, about 20° C.) with a stirrer for about 5 minutes, and after 20 minutes the viscosity was measured on the Brookfield RVT at 20° C. and 20 rpm with the suitable spindle. Table II shows the viscosity increase.

TABLE II

| Mixture | | Theor. Visc. | Actual Visc. | % |
|---|---|---|---|---|
| Xanthan | HPCaGa | (mPas) | (mPas) | Increase |
| 100 | 0 | — | 3,000 | — |
| 50 | 50 | 1,600 | 7,000 | 337 |
| 25 | 75 | 900 | 7,500 | 733 |
| 0 | 100 | — | 200 | — |

EXAMPLE 17

Mixtures of hydroxyethyl cassia galactomannan (=HECaGa) and xanthan

The percentage increase in viscosity effected by the synergism between hydroxyethyl cassia galactomannan and xanthan (Rhodigel 23) is demonstrated in this example. Mixtures of 75 or 50 weight percent of hydroxyethyl cassia galactomannan and, correspondingly, 25 or 50 percent complementary proportions of xanthan were prepared. Respectively 3 parts of these mixtures were stirred in 297 parts of water (cold, 20° C.) with a stirrer for 5 minutes, and after 20 minutes the viscosity was measured on the Brookfield RVT.

TABLE III

| Mixture | | Theor. Visc. | Actual Visc. | % |
|---|---|---|---|---|
| Xanthan | HECaGa | (mPas) | (mPas) | Increase |
| 100 | 0 | — | 3,000 | — |
| 50 | 50 | 1,630 | 4,800 | 194 |
| 25 | 75 | 945 | 5,200 | 450 |
| 0 | 100 | — | 260 | — |

EXAMPLE 18

Mixture of carboxymethyl cassia galactomannan (=CMCaGa) and xanthan

Various mixtures of carboxymethyl cassia galactomannan with xanthan were prepared and stirred in 1% amount into cold water.

TABLE IV

| Mixture | | Theor. Visc. | Actual Visc. | % |
|---|---|---|---|---|
| Xanthan | CMCaGa | (mPas) | (mPas) | Increase |
| 100 | 0 | — | 3,000 | — |
| 50 | 50 | 1,545 | 8,500 | 450 |
| 25 | 75 | 817.5 | 8,000 | 878 |
| 0 | 100 | — | 90 | — |

EXAMPLE 19

Mixture of methyl cassia galactomannan (=MCaGa) with xanthan

Various mixtures of methyl cassia galactomannan with xanthan were prepared and stirred in a 1% amount into cold water.

TABLE V

| Mixture | | Theor. Visc. | Actual Visc. | % |
|---|---|---|---|---|
| Xanthan | MCaGa | (mPas) | (mPas) | Increase |
| 100 | 0 | — | 3,000 | — |
| 50 | 50 | 1,650 | 7,000 | 324 |
| 25 | 75 | 975 | 6,200 | 538 |
| 0 | 100 | — | 300 | — |

EXAMPLE 20

The thermal and alkali stability of the aqueous solution of the mixture of 75 parts *Cassia tora* polygalactomannan derivative and 25 parts of xanthan gum are demonstrated in this example. Respectively, 1.5 parts of these mixtures were stirred with a stirrer for about 5 minutes at room temperature into 298.5 parts of an artificial sea water consisting of 96.7 parts of conductivity water, 3 parts of NaCl, 0.2 parts of $MgCl_2.H_2O$, and 1 part of KCl. After 15 minutes, the viscosity was measured on the Brookfield rotary viscometer at 20° C. and 100 rpm, with spindle 3.

The following table shows the viscosity of the respective mixture at 20° C. and a pH of 7 or 10.7.

| | Viscosity at 20° C. | |
|---|---|---|
| Mixture | pH 7 | pH 10.7 |
| HPCaGa/Xanthan (75:25) | 150 mPas | 145 mPas |
| HECaGa/Xanthan (75:25) | 200 mPas | 200 mPas |
| CMCaGa/Xanthan (75:25) | 40 mPas | 45 mPas |
| MCaGa/Xanthan (75:25) | 120 mPas | 125 mPas |
| PHCaGa/Xanthan (75:25) | 230 mPas | 220 mPas |

These solutions were kept for 16 hours in autoclave bottles in the drying chamber at 115° C., and the viscosity was then measured at 20° C. Before the measurement, the solutions were stirred for 5 minutes in the high speed stirrer.

| Mixture | Viscosity at 20 ° C. | Actual pH value |
|---|---|---|
| HPCaGa/Xanthan (75:25) | 280 mPas | 9.1 |
| HECaGa/Xanthan (75:25) | 270 mPas | 9.6 |
| CMCaGa/Xanthan (75:25) | 320 mPas | 9.6 |
| MCaGa/Xanthan (75:25) | 200 mPas | 9.6 |

-continued

| Mixture | Viscosity at 20° C. | Actual pH value |
|---|---|---|
| PHCaGa/Xanthan (75:25) | 160 MPas | 10.4 |

EXAMPLE 21

Mixtures of hydroxypropyl cassia galactomannan (=HPCaGa) with various DS (degrees of substitution) and xanthan In this example, the percentage viscosity reduction in 50% methanol, due to synergism between hydroxypropyl cassia galactomannan with a DS of 0.3 or 0.4 and xanthan (Rhodigel 23), is described. Mixtures of 75 weight percent of HPCaGa and corresponding 25% complementary proportions of xanthan were prepared. Respectively, 3 parts of these mixtures in 297 parts of 50% methanol (cold, about 20° C.) were stirred with a stirrer for about 20 minutes, and after 20 minutes the viscosity was measured on the Brookfield RVT at 20° C. and 20 rpm with the suitable spindle.

Table VI shows the viscosity increase.

TABLE VI

| | | | Viscosity in 50% Methanol, mPas Actual Viscosity | | | | |
|---|---|---|---|---|---|---|---|
| Xan-than | HPCaGa DS: 0.3 | DS: 0.4 | 1% | 5% | 0.25% | Theor. Viscosity | % Increase |
| 100 pts. | — | — | 3000 | — | — | | |
| 100 pts. | — | — | — | 800 | — | | |
| 100 pts. | — | — | — | — | 200 | | |
| — | 100 pts. | — | 55 | — | — | | |
| — | — | 100 pts. | 110 | — | — | | |
| 25 pts. | 75 pts. | — | 2500 | — | — | 241 | 938 |
| 25 pts. | — | 75 pts. | 2000 | — | — | 282 | 609 |

The gel structure of these gels remains stable, even after 3 days at −20° C., and prevents the settling out of, e.g., locust bean kernels, soy beans and carbon granulate for at least 24 hours.

EXAMPLE 22

A printing paste for printing a polyamide carpet with cut loops was produced according to the following recipe:

```
400 g of a 3% solution of hydroxypropyl cassia (produced
       according to Example 1)
450 g water
  3 g C.I. Acid Red 275
 20 g butyl diglycol
  8 g arylalkyl polyglycol ether
 12 g ammonium sulfate
  2 g defoaming agent
  y g makeup
1,000 g
```

A second printing paste was prepared with a 3% solution of hydroxypropylized LBG, and otherwise as above. The two color pastes were adjusted to equal viscosity and printed for comparison on the given substrate, on a rotary printing machine. The prints were fixed and finished. The prints obtained clearly showed that the use of hydroxypropyl cassia according to the invention as thickening agent in a dye paste gave better printing results than use of the LBG ether. This is evidenced in a better penetration of the printing paste into the substrate and a reduced amount of graying.

EXAMPLE 23

The printing pastes prepared according to Example 22 were adjusted to the same viscosity of 3,500 mPas on the Brookfield viscometer RVT (20 rpm, 20° C.).

Both pastes were measured on the Rotovisco II, of the firm of Haake, and a so-called flow curve was produced by simultaneous measurement/recording of the pair of values, shearing stress and shear gradient, for determination of the rheological properties.

The paste prepared from hydroxypropyl cassia showed "longer, tackier" flow behavior in comparison to the other.

This also explains the better penetration of the thickening according to the invention, as observed in Example 22.

EXAMPLE 24

Dye pastes for spaces of polyamide knitted tubes were prepared according to the following recipe:

```
  x g dyestuff
 15 g butyl diglycol
 15 g alkylaryl polyglycol ether
200 g thickening, 3%
 12 g acetic acid, 60%
  2 g defoamer
  y g water
1,000 g
```

As a comparison thickening there were used:
(1) hydroxyethyl cassia according to the invention (produced according to Example 2)
(2) hydroxyethyl guar
(3) hydroxyethyl LBG The following were chosen as dyestuffs for the comparison:
Bottom color:
  2.0 g C.I. Acid Blue 264
  0.2 g C.I. Acid Gree 41
Print 1:
  2.0 g C.I. Acid Black 172
Print 2:
  6.0 g C.I. Acid Blue 264
  4.0 g C.I. Acid Blue 260

The dye pastes were adjusted to equal viscosity. After padding and printing, the dyestuffs were fixed at 102° C. for 10 minutes in saturated steam.

A comparison of the color yield and also of later processability on parting the knitted tubes showed no difference between the thickening of hydroxyethyl cassia according to the invention and the thickening of hydroxyethyl LBG. However, both thickenings were clearly superior in their printing appearance to the thickening of hydroxyethyl guar.

EXAMPLE 25

For printing with disperse dyestuffs on polyester woven and knitted fabrics, three dye pastes were prepared according to the following recipe:

```
 20 g C.I. Disperse Red 90
 40 g C.I. Disperse Red 54
600 g thickening solution, acidified with citric acid to pH 5.2
 12 g fixing accelerator
  1 g defoamer
  y g makeup
```

1,000 g dye paste

The thickening solution of dye paste 1 was prepared at 5% and had the following composition: 75 parts of depolymerized hydroxyethyl cassia combined with 25 parts of starch ether.

The thickening solution of dye paste 2 consisted of a combination of 75 parts of depolymerized guar with 25 parts of starch ether and had to be applied at 7% in order to have the same viscosity as dye paste 1.

The thickening solution of dye paste 3 consisted of a combination of 75 parts of alkoxylated LBG with, again, 25 parts of starch ether. For adjustment to equal viscosity to dye pastes 1 and 2, an 8% mixture was necessary.

The comparison printings took place on flat film, rotary, and cylinder printing machines. Fixing of the prints was performed in superheated steam.

Comparison of the prints showed that, as regards penetration and evenness, dye paste 1 with its 5% thickening solution gave an equally good, and in part even better, result on all printing units than dye pastes 2 and 3, the thickening solutions of which had to be prepared at 7% and 8% respectively. The prints of dye pastes 1 and 2 were judged to be equally good in depth of color and brilliance; as opposed to this, the prints with dye paste 3 turned out somewhat weaker.

It is clear from this example that equally good—and in part even better—printing results are obtained when hydroxypropyl cassia is used as the thickening agent, at a far lower mixture concentration, than with the fuller-bodied thickening agents described in the Example.

EXAMPLE 26

For dyeing to solid shades of polyamide carpet with cut loops, on a dyeing unit with dye application roller, two dye liquors were prepared according to the following recipe:

```
    5 g  C.I. Acid Brown 331
  200 g  thickening solution 2.5%
    5 g  alkoxylated fatty acid amide
    3 g  acetic acid 60%
    1 g  defoamer
  786 g  water
1,000 g  dye liquor
```

The thickening solution of dye liquor 1 was produced with hydroxyethyl cassia, and of dye liquor 2 with hydroxyethyl LBG. After finishing of the dyed display goods it could be seen that the substrate dyed with dye liquor 1 had a deeper-colored and also more brilliant appearance than the material dyed for comparison with dye liquor 2.

EXAMPLE 27

A printing paste for printing with cationic dyestuffs on polyacrylonitrile was prepared according to the following recipe:

```
   35 g  C.I. Basic Yellow 11
    5 g  C.I. Basic Blue 1
  600 g  thickening solution
   20 g  acetic acid 30%
   20 g  Luprintan PFD (R)
   10 g  Glyecin A (R)
```

```
    x g  makeup
1,000 g
```

The thickening solution consisted

| | |
|---|---|
| in Case A of | 60 parts by weight depolymerized, cationic cassia ether (trimethylammonium hydroxypropyl cassia chloride) |
| | 40 parts by weight British gum |
| in Case B of | 60 parts by weight depolymerized guar |
| | 40 parts by weight British gum |
| in Case C of | 60 parts by weight carboxymethyl locust bean gum |
| | 40 parts by weight British gum |

The printing pastes were adjusted to equal viscosity and printed on polyacrylonitrile muslin, then fixed in saturated steam for 30 minutes.

The print according to recipe C was spotty, agglomerates obviously having arisen between the cationic dyestuff and the anionic galactomannan ether.

Recipe A gave a far more level and brilliant dye appearance than Recipe B.

EXAMPLE 28

500 l of finished sizing liquor were prepared in the Turbo-cooker with 25 kg of hydroxypropyl cassia galactomannan sizing agent according to Example 5 and 1.0 kg sizing wax. The following warp material was sized on a drum sizing machine: Nm 10/1 polyacrylonitrile yarn 100%, with 2,400 threads and the weaving set-up: threads per cm 17/17

Yarn count warp and yarn count filling each 10/1 The liquor temperature was 80° C. in the sizing trough. The warp yarn was immersed twice and squeezed out twice. The liquor pickup was 124%. The warp was woven on Jacquard looms to curtains. The efficiency was about 94%.

EXAMPLE 29

450 l of finished sizing liquor were prepared from 35 kg of hydroxypropyl cassia galactomannan according to Example 5, with the addition of 100 g of potassium persulfate and 1.5 kg of sizing grease.

The following warp material was sized: Nm 64/1 polyester/cotton in a 50%:50% blend ratio with 5,024 threads in the weaving set-up: 34/25–64/64. A drum sizing machine with 9 drying cylinders was available as the sizing machine. The liquor temperature was 80° C. The warp yarn was immersed twice in the liquor and squeezed twice with a squeezing performance of 129%. In the weaving room, an efficiency of 97% was achieved. Dust fallout was extremely small, both in the drying area of the sizing machine and in the weaving room.

EXAMPLE 30

450 l of finished sizing liquor were prepared in a Turbo-cooker with 35 kg of carboxymethyl cassia galactomannan according to Example 3, 150 g of potassium persulfate, and 0.5 kg of sizing grease. The following warp material was sized: Nm 70/1 cotton, provided for bed-ticking fabric, with 6,580 threads in the weaving set-up: 47/42–70/70. A drum sizing machine with 9 drying cylinders and 2 sizing troughs was available as the sizing machine. The liquor temperature during sizing was 80°–85° C. The warp yarn was immersed twice in the liquor and twice squeezed out with a squeezing performance of 134%. In the weaving room, an efficiency of 97% was achieved.

What is claimed is:

1. An ester or ether derivative of *Cassia tora* polygalactomannans selected from the group consisting of phosphoric acid esters and substituted $C_{1-4}$-alkyl ethers, wherein said substituents are selected from the group consisting of hydroxy, carboxy, di-$C_{1-4}$-alkylammonium, tri-$C_{1-4}$-alkylammonium and mixtures thereof.

2. The derivative of claim 1 wherein said ether is hydroxypropyl ether.

3. The substituted $C_{1-4}$alkylether derivative of claim 1 wherein the degree of substitution is 0.03–3.0.

4. The derivative of claim 3 wherein the degree of substitution is 0.1–0.5.

5. The derivative of claim 1 having a viscosity of 100–40,000 mPas.

6. The derivative of claim 1 which has been depolymerized.

7. In a method of textile manufacture comprising the use of a textile auxiliary, the improvement comprising using the derivative of claim 1 as said textile auxiliary.

8. A method for thickening a solution comprising adding an effective amount of the derivative of claim 1 to the solution as a thickening agent.

9. The method of claim 8, wherein said solution is selected from the group consisting of a printing paste for textile printing and a dye solution for the continuous dyeing of textile substrates.

10. In the method of claim 7, wherein said textile auxiliary further comprises a polysaccharide derivative selected from the group consisting of xanthan, carrageenan, polymers of acrylic acid or salts thereof, copolymers of acrylic acid or salts thereof and mixtures thereof.

11. The method of claim 8, wherein an effective amount of a polysaccharide derivative selected from the group consisting of xanthan, carrageenan, polymers of acrylic acid or salts thereof, copolymers of acrylic acid or salts thereof and mixtures thereof is further added to the solution as a thickening agent.

12. The method of claim 9, wherein an effective amount of a polysaccharide derivative selected from the group consisting of xanthan, carrageenan, polymers of acrylic acid or salts thereof, copolymers of acrylic acid or salts thereof and mixtures thereof is further added to said solution as a thickening agent.

* * * * *